United States Patent
Adamietz et al.

[19]

[11] Patent Number: 6,100,476
[45] Date of Patent: Aug. 8, 2000

[54] OPERATING DEVICE WITH TWO-DIMENSIONAL DIALOGUE MOVEMENT

[75] Inventors: Hubert Adamietz, Aschaffenburg; Guido Meier-Arendt, Langen, both of Germany

[73] Assignee: Mannesmann VDO AG, Frankfurt, Germany

[21] Appl. No.: 09/116,065

[22] Filed: Jul. 15, 1998

[30] Foreign Application Priority Data

Jul. 15, 1997 [DE] Germany .............................. 19730297

[51] Int. Cl.⁷ .................................................. H01H 19/46
[52] U.S. Cl. ............................................. 200/4; 307/10.1
[58] Field of Search ......................... 200/4, 519, 318.2; 307/10.1

[56] References Cited

U.S. PATENT DOCUMENTS 5,140,111  8/1992  Vultaggio et al. ......................... 200/4
5,665,946  9/1997  Nishiijima et al. ......................... 200/4
6,005,299 12/1999  Hengst .................................. 307/10.1

FOREIGN PATENT DOCUMENTS 0701926   3/1996  European Pat. Off. .
3836555   5/1990  Germany .
29614599 11/1996  Germany .
29705812  7/1997  Germany .

*Primary Examiner*—Renee Luebke
*Attorney, Agent, or Firm*—Martin A. Farber

[57] ABSTRACT

An operating device with a two-dimensional dialogue movement for selecting and calling functions and groups of functions, especially for use in motor vehicles. The dialogue can be moved in a first dimension by rotating a rotary switch that is in a first axial position. The dialogue can be moved in a second dimension by turning the rotary switch which is in a second axial position. The selected functions or groups of functions can be called by another switch. A device feeds back the selected functions or groups of functions optically, acoustically, and/or haptically.

15 Claims, 4 Drawing Sheets

Fig. 3
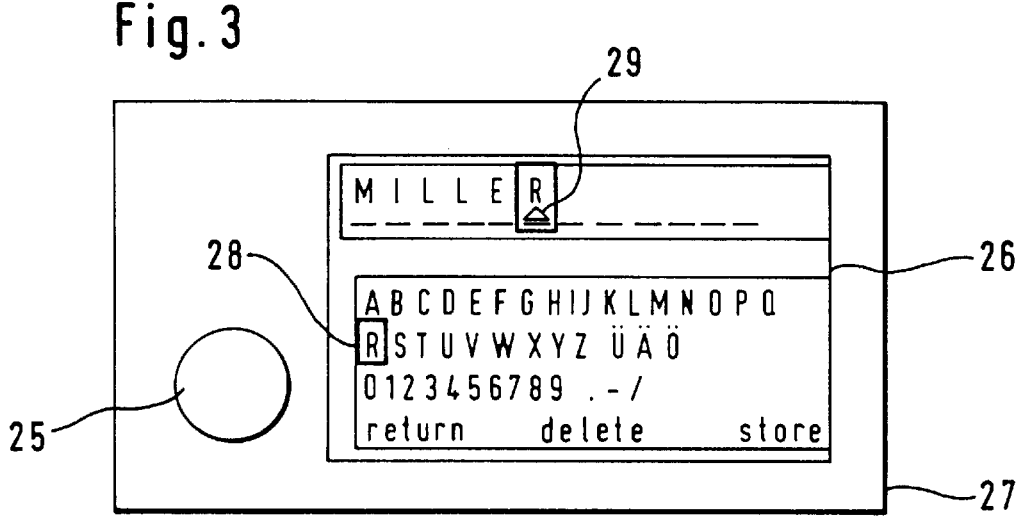
Fig. 4a
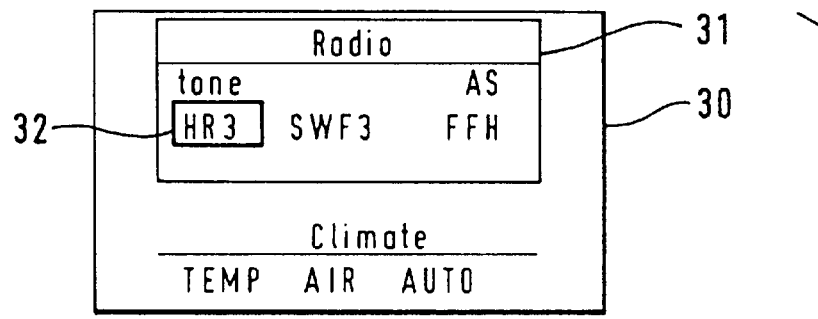
Fig. 4b
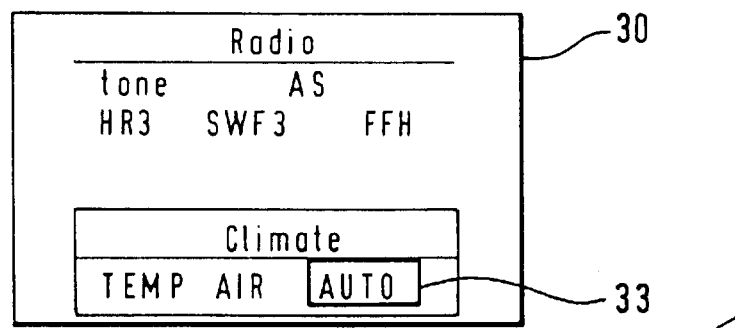
Fig. 4

Fig. 5a
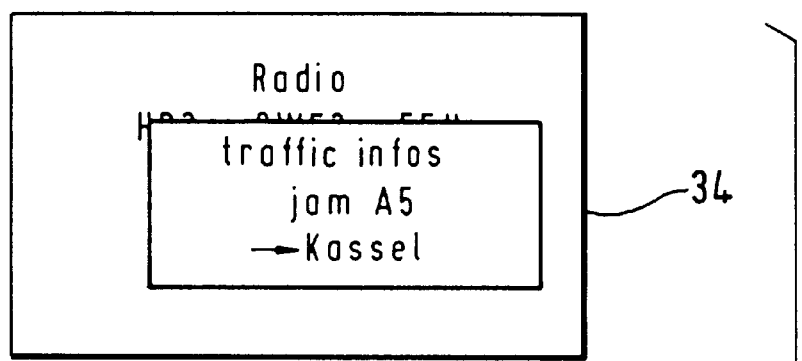
Fig. 5b
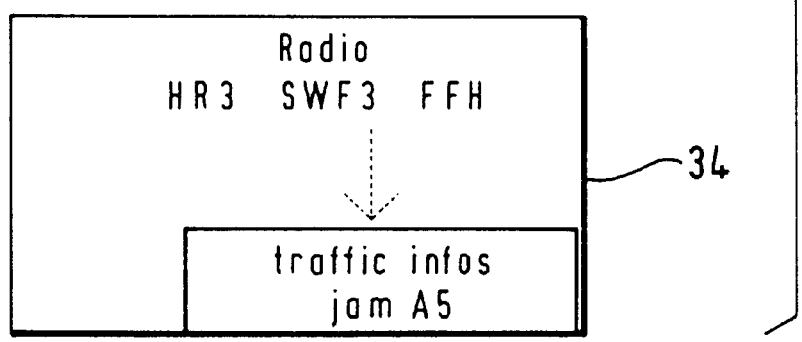
Fig. 5

OPERATING DEVICE WITH TWO-DIMENSIONAL DIALOGUE MOVEMENT

FIELD AND BACKGROUND OF THE INVENTION

The invention relates to an operating device with two-dimensional dialogue movement to select and call functions and groups of functions, especially for use in motor vehicles.

It is known from the prior art to enter commands in data processing systems by using typewriter keyboards with additional control keys. Especially in personal computers (PCs), it is conventional to represent functions and groups of functions on a screen by appropriate icons and to select them by means of an indicating marker (cursor) that can be moved across the screen in the horizontal and/or vertical direction, and to call them by actuating a particular switch (carriage return or CR for example). In this case, the cursor can be moved horizontally and vertically across the screen by operating four arrow keys. This procedure is time-consuming and cumbersome, however. For this reason, a hand-held pointing device, a so-called mouse, is frequently employed. The movement of the cursor across the screen is produced by sliding the mouse on a flat surface in the desired direction that corresponds to the position on the screen. When the cursor is on the desired icon, the function represented by the icon can be selected by pressing a button and thereby executed.

The use of a mouse, however, can only be recommended on flat, even surfaces. On uneven surfaces, considerable attention and skill are required on the part of the operator to align the cursor with the desired icon. In addition, the surface over which the mouse is moved must have a considerable area.

SUMMARY OF THE INVENTION

It is therefore an object of the invention to provide an input device for two-dimensional dialogue movement that is simple to operate and does not require a vibration-free base.

This object is achieved by an operating device with a rotary switch in which the dialogue can be moved in a first dimension by rotating a rotary switch (DS) in a first axial position and can be moved in a second dimension by rotating the rotary switch in a second axial position. The selected function or group of functions can be called by an additional switch and displayed optically, acoustically, and/or haptically by a suitable device.

It is advantageous in this regard for the rotary switch to require only a small amount of space and to be integrated readily into an electronic device or into a motor vehicle. Because of its small size, it is also advantageous in motor vehicles for an installation location to be found that can be reached easily by the driver, and thus adversely affects the driver to only a limited extent in guiding the motor vehicle.

If the axial change of the rotary switch from the first axial position to the second axial position is accomplished by applying pressure, operation becomes especially simple for the operator since the operator is only required to add an additional load by applying the weight of his/her hand.

Furthermore, an elastic element urges the rotary switch (DS) flexibly into a first axial position.

The dialogue can be moved in the second dimension by pressing and simultaneously turning the rotary switch.

By virtue of the fact that the additional switch can be operated by pressing or pulling the rotary switch, and the selected functions or groups of functions are called by a bi-directional actuation of the rotary switch in the axial direction, operability is further simplified since all of the inputs can be performed with one hand without changing the operating element, and the dimensional movement is changed by an axial change in the rotary switch.

Provided the rotary switch outputs haptic feedback information, the operator can sense information about the position through the feedback that he would otherwise have to obtain optically from the screen or would have to obtain acoustically. The fact that the haptic feedback information differs as a function of the axial position and/or radial position of the rotary switch means that the user, without looking at a screen, can determine when the operating device switches from the first dimension to the second dimension.

Likewise, depending on the functional value, function, or group of functions, the user can obtain different haptic feedback information through his fingers that operate the rotary switch, as to which function and group of functions he is currently selecting without having to pay attention to acoustic or optic information.

By displaying the functional values, functions, or groups of functions that can be selected and called on a display, the operator obtains quick information about the functions that can be selected at the moment, and about the adjacent functions that can be selected and/or called.

An optical highlighting of the selected functions or groups of functions further simplifies operation and increases clarity.

There are further features, namely, the selected function or group of functions which can be displayed with highlighting.

The selected function or groups of functions can be displayed optically highlighted.

A map or a portion of a map can be shown on a display.

Geographic points can be selected by means of a two-dimensional movable cursor.

In order for the names of the selected or called geographic locations or points to be displayable on a map shown on a display, a clear representation is possible without the representation being overloaded with too much information that is not required. By using horizontal and vertical display bars that extend over the entire width and height of the map, and which can be adjusted vertically or horizontally, an exact input is possible with only one change of dimension, even without practice.

The dimensional change in the dialogue movement is fed back optically.

The dimensional change of the dialogue movement is fed back acoustically.

BRIEF DESCRIPTION OF THE DRAWINGS

With the above and other objects and advantages in view, the present invention will become more clearly understood in connection with the detailed description of preferred embodiments, when considered with the accompanying drawings of which:

FIG. 3 is a rotary switch and display with an alphanumeric menu;

FIG. 4, which comprises FIG. 4a and FIG. 4b, shows a display with two menus; and FIG. 5, which comprises FIG. 5a and FIG. 5b, is a display with superimposed traffic information.

DETAILED DESCRIPTION OF THE PREFERRED EMBODIMENTS

Figure 1:
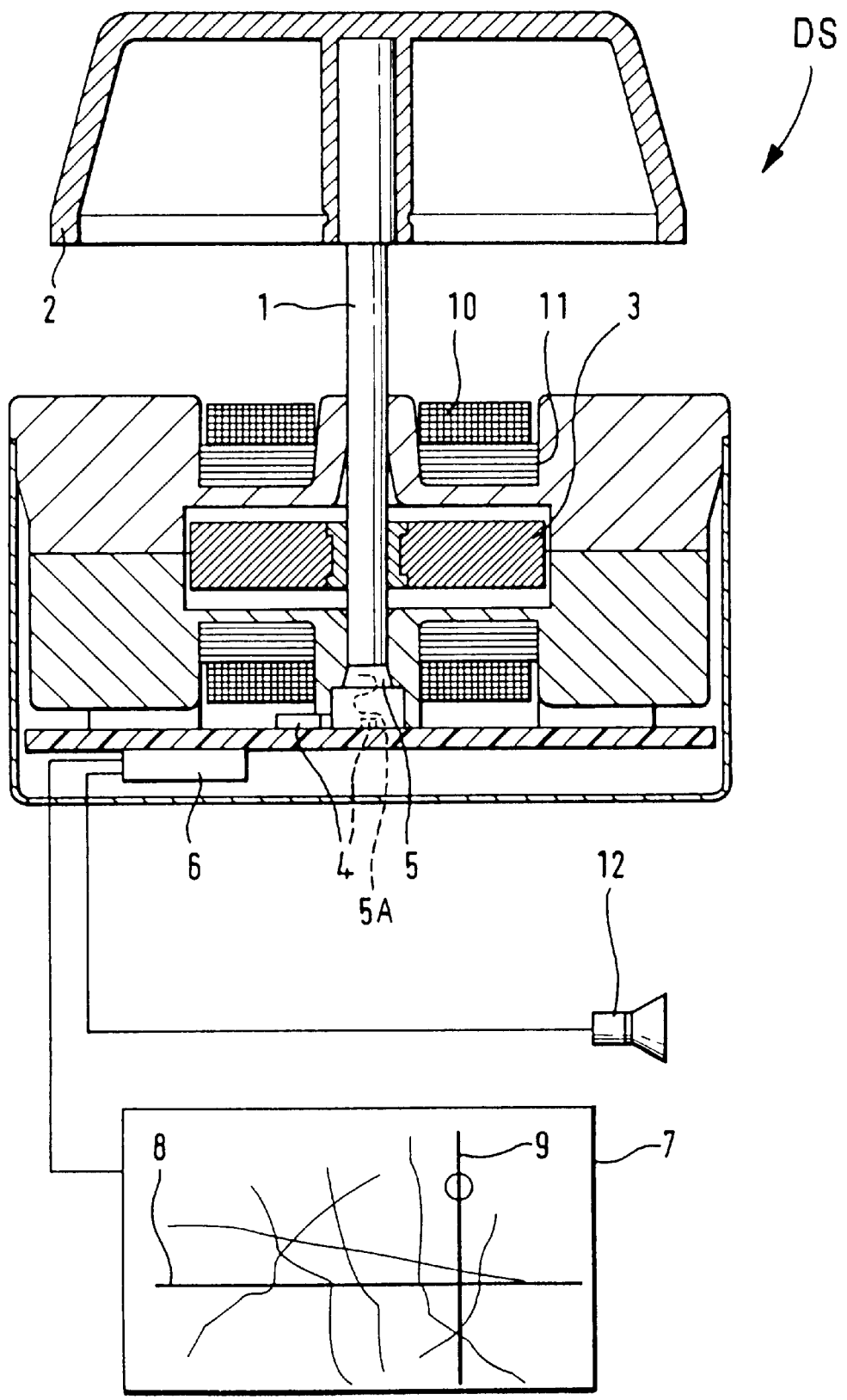
FIG. 1 is an especially preferred rotary switch with a control and evaluation unit and a display.

In FIG. 1, the rotary switch is designed as a haptic rotary positioning device DS. In this case, a shaft 1 is connected nonrotationally with a handle 2 and a diametrically magnetized disk 3. Two Hall sensors 4 are positioned, offset by 90° with respect to one another so that they produce different voltages depending on the radial position of the diametrically magnetized disk. The shaft 1 is located in a first axial position and in this position contacts a switch 5 of the handle 2 when the latter is not pressed. When the handle is pressed in the axial direction into its second axial position, the shaft is pushed downward at the same time into a second axial position and actuates the switch 5. When the pressure on the handle in the axial direction is released, a compression spring contained in the switch 5 presses on the switch and thus moves the shaft 1 and the handle 2 into the first axial position that corresponds to the position shown in FIG. 1

From the voltages generated in the Hall sensors 4, an evaluation and control unit 6 determines the position of the diametrically magnetized disk and hence of the handle and, depending on the axial position of the handle 2, controls a horizontal indicating bar 8 or a vertical indicating bar 9 on a display 7. As a result, the respective display bar 8 or 9 is displaced vertically or horizontally, corresponding to the rotation of the handle. The switch between the individual bars is performed by a simple depression or release of the handle 2 of haptic rotary adjusting device DS, without an additional menu having to be selected or an additional switch having to be actuated.

When the desired point on the display 7 corresponds to the intersection of the two display bars 8, 9, the point can be entered or selected by pressing again and then releasing or reducing the axial pressure on the handle 2. This requires a minimum expenditure of time and also does not require any significant gripping of the handle. It is also possible, when "input"="call" for the selected point, to design the rotary switch so that it can assume a third axial position that can be reached by pulling on the handle 2 in the axial direction and thus for example to design switch 5 so that in the third axial position it sends a corresponding signal to the evaluation and control unit 6 and also calls the selected point. The use of display bars 8, 9 is not limited exclusively to selecting points on maps. It is also possible to use the display bars 8, 9 to select letters from an alphanumeric menu for example, or to select a desired menu when several menus are displayed on a screen 7 by displacing the two display bars 8, 9 relative to the corresponding menu. Of course, it is also possible, for example, to use a cruciform cursor to indicate the selected point on the display 7. However, this requires more concentration and practice on the part of the user of the operating device.

By means of the coils 10, 11, depending on the radial and axial positions of the handle 2 and/or of the function or group of functions to be selected, a force can be exerted on the diametrically magnetized disk 3 depending on the radial and axial positions of handle 2 and/or the selected function or group of functions. Thereby the feeling of latching steps, which can be overcome by different amounts of force being expended, or a uniformly easy or difficult operating mode can be conveyed to the user. For this purpose, the evaluation and control device 6 controls the corresponding required current through the coils 10, 11. Feedback can also be provided acoustically to the user through a loudspeaker 12 by using a speech module, not shown, or the evaluation and control device 6.

Figure 2:
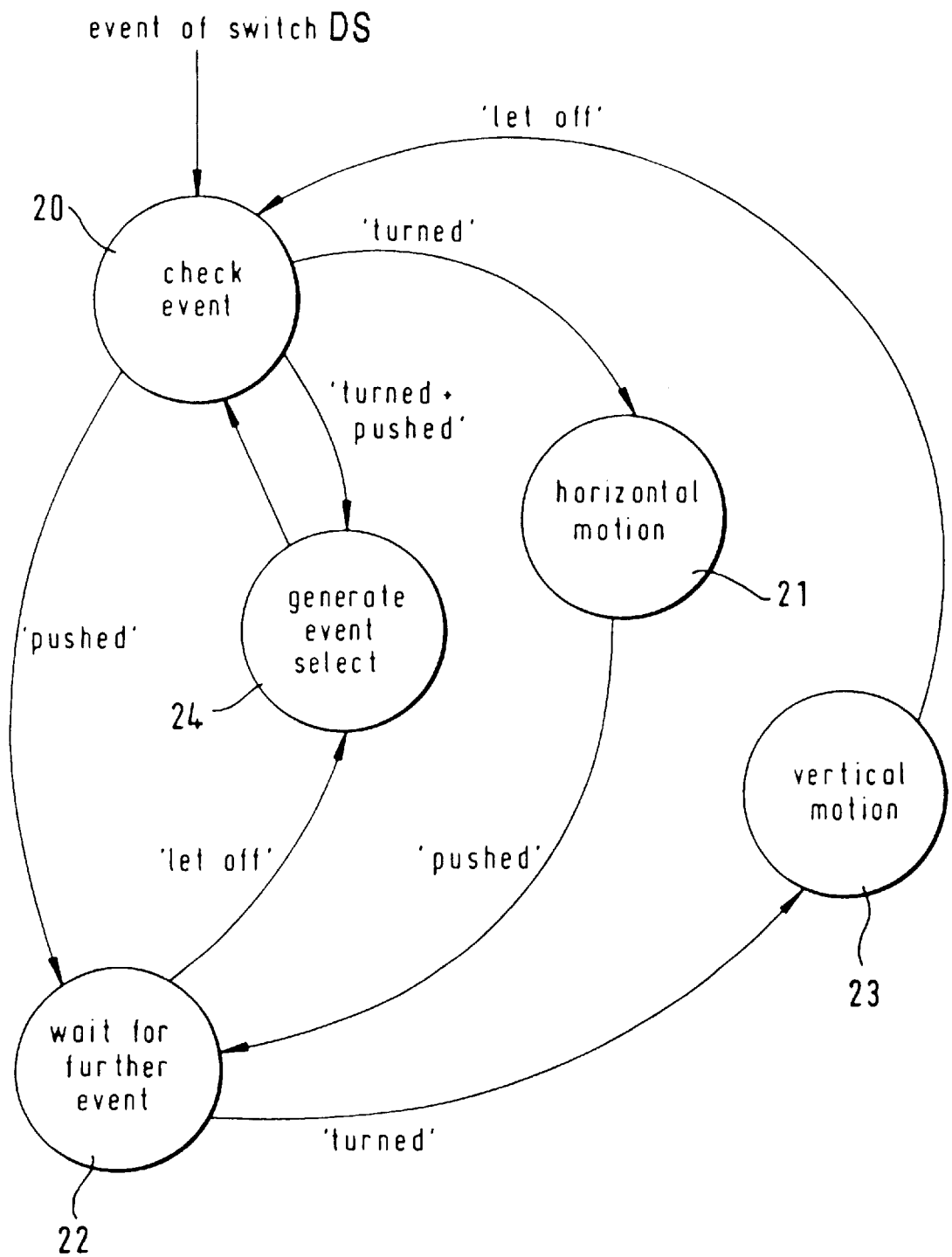
FIG. 2 is a configuration of a routine of the control/evaluation unit in FIG. 1.

In the routine shown in FIG. 2, the event, in other words the information from the rotary switch DS, is checked initially in block 20. If it was only turned, in block 21 the command is sent to the display 7 to move the dialogue horizontally, in other words, the vertical display bar 9 is displaced horizontally corresponding to the rotational angle determined If the switch is then pressed, block 22 waits for an additional event. If block 22 determines that the event was "rotated," the command is sent in block 23 to the display 7 to move the dialogue vertically, i.e. the horizontal display bar 8 is displaced vertically as a function of the rotational angle of the handle 2 that was determined. If it is then released, a new event that arrives is checked in block 20. If the event is determined to have been "pressed," block 22 waits for another event As soon as the event "released" is determined to have occurred, the function or group of functions previously selected by the horizontal and vertical dialogue movement is called in block 24. In the example shown in the figure therefore, the point or the location is determined by the intersection of the display bars 8, 9 on the map of the display 7. If the event "rotated and pressed" is determined in block 20 to have occurred, the function or group of functions that has just been selected is determined in block 24.

In the example shown in FIG. 3, the handle 25 of the rotary switch and the display 26 are accommodated in a common housing 27. An alphanumeric menu for selection of letters and numbers is displayed in the lower area of the display 26. A name is input as follows:

The letters of the desired name are selected by moving the rectangular cursor by turning and pressing the handle 25 and called by pressing and releasing the handle 25. The horizontal displacement is produced by turning the rotary switch while the vertical displacement is produced by turning and pressing the rotary switch. As soon as a letter has been called it is displayed in the upper area of the screen 26, beginning at the left. The arrow 29 jumps to the next position to the right for entering the next letter after the previous entry has been completed. If the desired name is written out in full, the cursor 28 can be moved to the "save" field. Then the name can be called by pressing and releasing the handle; in other words, it can be entered. If a letter has been entered incorrectly, the arrow 29 can be shifted to the desired position by selecting and calling the "back" field and deleted either by selecting and calling the "delete" field or it can be overwritten by selecting and calling the correct letter In FIG. 4, the two menus "radio" and "climate" are displayed on the display 30. The margin 31 of the radio menu is intended to show that this menu is emphasized optically, since it has been called. This optical emphasis can be in the form of a margin, as shown, a change in color, or a reversal of the display mode, for example a change from positive to negative display. The radio transmitter HR3 is selected by using the cursor 32. Since the menus are shown stacked in FIGS. 4a, 4b, it is possible to switch to the other menu by simultaneously rotating and pressing the handle of the rotary switch. In FIG. 4b, the function "auto" (=automatic) on the climate control menu is then selected, as can be seen from the cursor 33.

Finally, the operating device according to the invention can be improved in such fashion that a menu window can be displaced by simultaneously turning and pressing the handle, as shown in FIGS. 5a, 5b. This is especially advantageous when additional information, that has been received regarding a traffic situation, for example, is displayed in display 34, and covers another menu as shown in FIG. 5a.

We claim:

1. An operating device with two-dimensional image movement to select and to call functions and groups of functions, suitable for use in motor vehicles, the operating device comprising:

a rotary switch operative to move the image can be moved in a first dimension by placing the rotary switch in a first axial position, and by rotating the rotary switch in the first axial position, wherein the image can be moved in a second dimension by placing the rotary switch in a second axial position, and by rotating the rotary switch in the second axial position; and an additional switch, and a display device, wherein the selected functions or group of functions can be called by the additional switch and presented optically, acoustically, and/or haptically by th e display device.

2. An operating device according to claim 1, further comprising an elastic element which urges the rotary switch flexibly into the first axial position.

3. An operating device according to claim 2, wherein the image is moveable in the second dimension by pressing and simultaneously turning the rotary switch.

4. An operating device according to claim 1, wherein the additional switch is operable by a pressing or a pulling of the rotary switch, and the selected functions or groups of functions are called by a bi-directional actuation of the rotary switch in a direction along an axis of the rotating switch.

5. An operating device according to claim 1, wherein the rotary switch outputs haptic feedback information to an operator of the rotary switch, and the operator can sense information about a position of the rotary switch through the feedback, which information would otherwise have to be sensed optically from a screen or acoustically.

6. An operating device according to claim 1, wherein names of selected or called geographic locations or points are displayed on a map presented on the display device.

7. An operating device according to claim 1, further comprising optical feedback means operatively coupled to the rotary switch, enabling a dimensional change in the image movement to be fed back optically.

8. An operating device according to claim 1, further comprising feedback means operatively coupled to the rotary switch, enabling a dimensional change in the image movement to be fed back acoustically.

9. An operating device according to claim 1, wherein the display device displays functional values, functions, or groups of functions to be selected on the display device.

10. An operating device according to claim 9, wherein the selected function or groups of functions can be displayed with highlighting.

11. An operating device according to claim 9, wherein the display device is operative to show a map or a portion of a map on a display.

12. An operating device according to claim 11, wherein geographic points of the map are selectable by means of a two-dimensional movable cursor located on the display device.

13. An operating device according to claim 11, wherein geographic points are selected by use of horizontal and vertical display bars which are adjustable vertically or horizontally, respectively.

14. An operating device with two-dimensional image movement to select and to call functions and groups of functions, suitable for use in motor vehicles, the operating device comprising:

a rotary switch in which the image can be moved in a first dimension by placing the rotary switch in a first axial position, and by rotating the rotary switch in the first axial position, wherein the image can be moved in a second dimension by placing the rotary switch in a second axial position, and by rotating the rotary switch in the second axial position; and an additional switch, and a display device, wherein the selected functions or group of functions can be called by the additional switch and presented optically, acoustically, and/or haptically by the display device;

wherein the rotary switch outputs haptic feedback information to an operator of the rotary switch, and the operator can sense information about a position of the rotary switch through the feedback, which information would otherwise have to be sensed optically from a screen or acoustically;

the haptic feedback information differs as a function of the axial position and/or radial position of the rotary switch.

15. An operating device with two-dimensional image movement to select and to call functions and groups of functions, suitable for use in motor vehicles, the operating device comprising:

a rotary switch in which the image can be moved in a first dimension by placing the rotary switch in a first axial position, and by rotating the rotary switch in the first axial position, wherein the image can be moved in a second dimension by placing the rotary switch in a second axial position, and by rotating the rotary switch in the second axial position; and an additional switch, and a display device, wherein the selected functions or group of functions can be called by the additional switch and presented optically, acoustically, and/or haptically by the display device;

wherein the rotary switch outputs haptic feedback information to an operator of the rotary switch, and the operator can sense information about a position of the rotary switch through the feedback, which information would otherwise have to be sensed optically from a screen or acoustically;

depending on a functional value, function, or group of functions, a user can obtain different haptic feedback information through his fingers that operate the rotary switch.

* * * * *